United States Patent
Cardonha et al.

(10) Patent No.: US 10,620,993 B2
(45) Date of Patent: Apr. 14, 2020

(54) AUTOMATED GENERATION OF SCHEDULING ALGORITHMS BASED ON TASK RELEVANCE ASSESSMENT

(71) Applicant: INTERNATIONAL BUSINESS MACHINES CORPORATION, Armonk, NY (US)

(72) Inventors: Carlos Henrique Cardonha, Sao Paulo (BR); Renato Luis de Freitas Cunha, Sao Paulo (BR); Vitor Henrique Leal Mesquita, Sao Paulo (BR); Eduardo Rocha Rodrigues, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 15/443,283

(22) Filed: Feb. 27, 2017

(65) Prior Publication Data

US 2018/0246758 A1    Aug. 30, 2018

(51) Int. Cl.
*G06F 9/44*    (2018.01)
*G06F 9/48*    (2006.01)
(Continued)

(52) U.S. Cl.
CPC .......... *G06F 9/4881* (2013.01); *G06N 20/00* (2019.01); *G06Q 10/0631* (2013.01);
(Continued)

(58) Field of Classification Search
CPC ....................................................... G06F 9/44
See application file for complete search history.

(56) References Cited

U.S. PATENT DOCUMENTS 7,072,805 B2    7/2006    Cascaval et al.
9,286,262 B2    3/2016    Lippett
(Continued)

FOREIGN PATENT DOCUMENTS

CN    101123571    2/2008
WO    WO 2015/167380    11/2015

OTHER PUBLICATIONS

Daniel M. Batista, et al. "Self-adjustment of resource allocation for grid applications," Computer Networks, vol. 52, Issue 9, Jun. 2008, pp. 1762-1781.
(Continued)

*Primary Examiner* — Jae U Jeon
(74) *Attorney, Agent, or Firm* — F. Chau & Associates, LLC

(57) ABSTRACT

A method for automatically generating scheduling algorithms, including determining a scheduling policy for a plurality of jobs to be executed on a computer system, where the scheduling policy specifies an execution order of a plurality of jobs; using the scheduling policy in a production environment for a period of time, and collecting data indicative of a business impact of each job executed during the period of time; generating a list of all pairwise comparisons of business impact between the plurality of jobs, together with outcomes of the comparisons; marking each pair for which the comparison outcome is inconsistent with the relative execution order of the pair of jobs according to a predefined criteria to create a reinforcement learning batch; and using the reinforcement learning batch to adjust a decision criteria used to determine the scheduling policy.

8 Claims, 6 Drawing Sheets

(51) Int. Cl.
    *G06N 20/00*    (2019.01)
    *G06Q 10/06*    (2012.01)
    *G06N 7/00*     (2006.01)
(52) U.S. Cl.
    CPC ... *G06Q 10/0633* (2013.01); *G06Q 10/06312* (2013.01); *G06N 7/005* (2013.01)

(56) References Cited

U.S. PATENT DOCUMENTS

| | | | |
|---|---|---|---|
| 2010/0257531 | A1 | 10/2010 | Barsness et al. |
| 2011/0161964 | A1 | 6/2011 | Piazza et al. |
| 2014/0067449 | A1 | 3/2014 | Malkin et al. |
| 2014/0109104 | A1 | 4/2014 | Majewski et al. |
| 2014/0136255 | A1 | 5/2014 | Grabovski et al. |
| 2016/0098300 | A1* | 4/2016 | Chang .................. G06F 9/4881 718/103 |
| 2017/0139751 | A1* | 5/2017 | Chen .................... G06F 9/5016 |
| 2018/0039932 | A1* | 2/2018 | Moreira-Matias ..... G06Q 50/30 |

OTHER PUBLICATIONS

Iuliana M. Bocicor, "A Study on Using Reinforcement Learning for Temporal Ordering of Biological Samples", Studia Univ. Babes, Bolyai, Informatica, vol. LVII, No. 4, 2012, pp. 63-74.

Rajkumar Buyya, et al., "Scheduling parameter sweep applications on global Grids: a deadline and budget constrained cost-time optimization algorithm," Software—Practice and Experience, 2005; vol. 35, pp. 491-512.

Bernhard Hengst, "Partial Order Hierarchical Reinforcement Learning," Advances in Artificial Intelligence., AI 2008, Lecture Notes in Computer Science, vol. 5360, pp. 1-12.

Subodha Kumar, et al., "Maximizing business value by optimal assignment of jobs to resources in grid computing," European Journal of Operational Research 194 (2009), pp. 856-872.

Rami J. Matarneh, "Self-Adjustment Time Quantum in Round Robin Algorithm Depending on Burst Time of the Now Running Processes," American Journal of Applied Sciences 6 (10): pp. 1831-1837, 2009.

* cited by examiner

AUTOMATED GENERATION OF SCHEDULING ALGORITHMS BASED ON TASK RELEVANCE ASSESSMENT

TECHNICAL FIELD

Embodiments of the present disclosure are directed to self-adjusting scheduling algorithms.

DISCUSSION OF THE RELATED ART

A challenge faced by service providers is to establish good scheduling policies to determine the order in which a list of tasks should be executed in situations where current system capacity is not able to avoid the formation of queues. Several scheduling policies have been proposed in the literature already, most of which are based on priority queues, in which tasks with higher priority are solved first, where the execution order of tasks reflect their relevance. In many situations, though, task relevance is ill-posed, in the sense that even system administrators are not aware of all the rules that should be applied for this assessment; in these cases, trial-and-error methodologies are typically employed, which is a manual process that is susceptible to errors and which might take a very long time to converge. Furthermore, these methodologies prioritize the minimization of cost while a more appropriate metric should be maximization of impact or expected return.

SUMMARY

Exemplary embodiments of the present disclosure are directed to a system and method for the automatic adjustment of a scheduling policy based on a verification module that checks whether previous decisions on comparisons between jobs were correct or if the outcome should be changed. This verification module may be manual, e.g., by relying on manual user feedback, or automatic, e.g., by basing the comparisons on the business impact of each job. Many data centers periodically review project priorities and use these priorities to set scheduling policies. A system and method according to exemplary embodiments can be used by the review committees to automatically adjust the scheduling priorities. Businesses can use a system and method according to an embodiment to determine which jobs produce the largest returns and prioritize them. For example, a weather forecast center can automatically prioritize certain simulations to address weather hazards.

According to an embodiment of the disclosure, there is provided a method for automatically generating scheduling algorithms, including determining a scheduling policy for a plurality of jobs to be executed on a computer system, where the scheduling policy specifies an execution order of a plurality of jobs; using the scheduling policy in a production environment for a period of time, and collecting data indicative of a business impact of each job executed during the period of time; generating a list of all pairwise comparisons of business impact between the plurality of jobs, together with outcomes of the comparisons; marking each pair for which the comparison outcome is inconsistent with the relative execution order of the pair of jobs according to a predefined criteria to create a reinforcement learning batch; and using the reinforcement learning batch to adjust a decision criteria used to determine the scheduling policy.

According to a further embodiment of the disclosure, the marking of each pair is performed manually.

According to a further embodiment of the disclosure, the marking of each pair is performed automatically, by associating each job with a measurable value, and marking each pair for which the measured value of a job is inconsistent with the priority of that job.

According to a further embodiment of the disclosure, the measurable values include an amount of revenue generated by the associated job, a public relations impact of the associated job, an ecological impact of the associated job.

According to an embodiment of the disclosure, there is provided a system for automatically generating a scheduling algorithm, including a scheduler that schedules jobs for a limited period of time based on a predetermined decision criteria and compares measurable values of pairs of jobs, where the measurable value is are indicative of a business impact of the associated job; a verification module that checks outcomes of some or all of the pairwise comparisons made by the scheduler and indicates which were wrong, based on whether the outcome is consistent with the respective priorities of each job; and a reinforcement learning algorithm that generates a new set of decision criteria to be used by the scheduler.

According to a further embodiment of the disclosure, the measurable values include an amount of revenue generated by the associated job, a public relations impact of the associated job, an ecological impact of the associated job.

According to another embodiment of the disclosure, there is provided a method for automatically generating a scheduling algorithm for a computer system, including defining a set of features for each job of a plurality of jobs; defining a set of priority classes into which the plurality of jobs are classified; clustering a set of historic job data to define clusters of jobs belonging to a same priority class, and identifying a representative job for each cluster; defining a priority level for each cluster; executing jobs on the computer system based on job requests received from users; calculating an average distance between a most recent number of jobs and the representative of each respective cluster; determining whether the average distance exceeds surpasses a pre-defined threshold, and defining a new set of priority classes into which the plurality of jobs are classified, when the average distance exceeds surpasses the pre-defined threshold.

According to a further embodiment of the disclosure, the representative job for each cluster is based on a centroid of each cluster.

According to a further embodiment of the disclosure, priorities are assigned to clusters based on a business value of the jobs in the cluster, where jobs in more valuable clusters receive a higher priority.

According to a further embodiment of the disclosure, identifying a cluster to which each job belongs comprises computing an Euclidean distance between each job and the representative of each cluster and selecting the cluster with a smallest value.

According to a further embodiment of the disclosure, the method including storing the distance between an incoming job and the representative of its cluster.

According to a further embodiment of the disclosure, executing jobs on the computer system further includes receiving job requests; extracting features from each received job; identifying a cluster to which each job belongs; assigning a priority to the received job based on the cluster to which the job belongs; submitting the job and its priority level to a scheduler; and executing the job.

According to another embodiment of the disclosure, there is provided a non-transitory program storage device readable by a computer, tangibly embodying a program of instructions executed by the computer to perform the method steps for automatically generating scheduling algorithms.

DETAILED DESCRIPTION OF EXEMPLARY EMBODIMENTS

Figure 1:
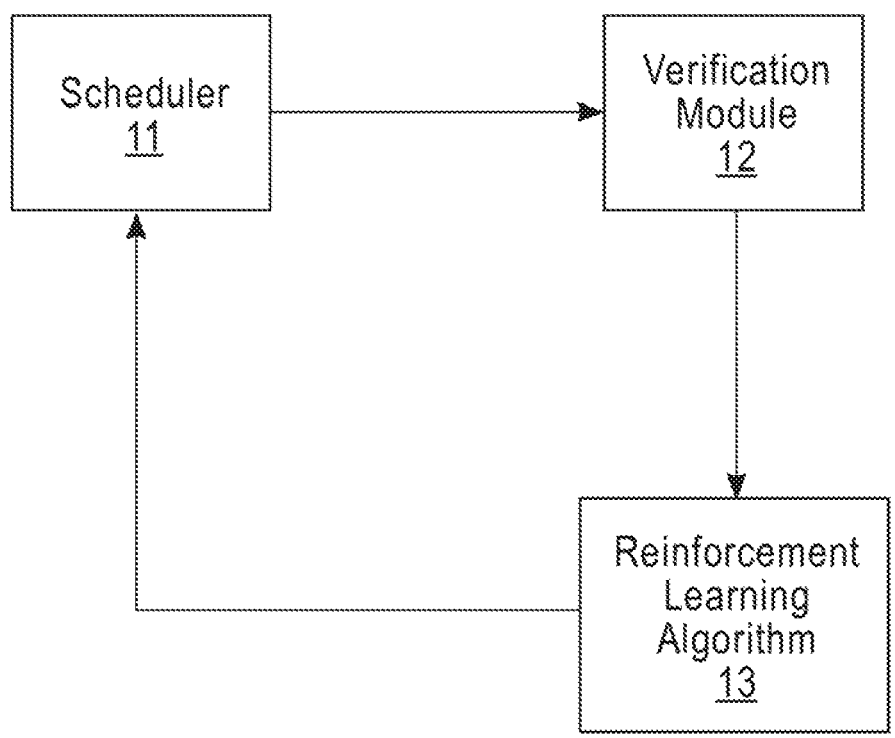
FIG. 1 depicts a system that implements a self-adjusting scheduling algorithm according to embodiments of the disclosure.

Exemplary embodiments of the disclosure as described herein generally include methods for automatically generating scheduling algorithms based on task relevance. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Exemplary embodiments of the present disclosure are directed to a system and method that learns a scheduling policy based on automated or user-guided verification of the relative ordering of tasks being currently scheduled by a scheduler. Exemplary embodiments of the present disclosure can identify suitable scheduling policies based on local verifications that can be performed a posteriori automatically or in a human-guided way. FIG. 1 depicts a system that implements a self-adjusting scheduling algorithm according to embodiments of the disclosure. Referring now to the figure, a system according to an embodiment includes a scheduler 11 that employs certain decision criteria to schedule jobs for a limited period of time, such as one day; a verification module 12 that checks the outcomes of all, or a subset of, pairwise comparisons made by the scheduler and indicates which were wrong; and a reinforcement learning algorithm 13 that generates a new set of decision criteria to be used by the scheduler 11.

Figure 2:
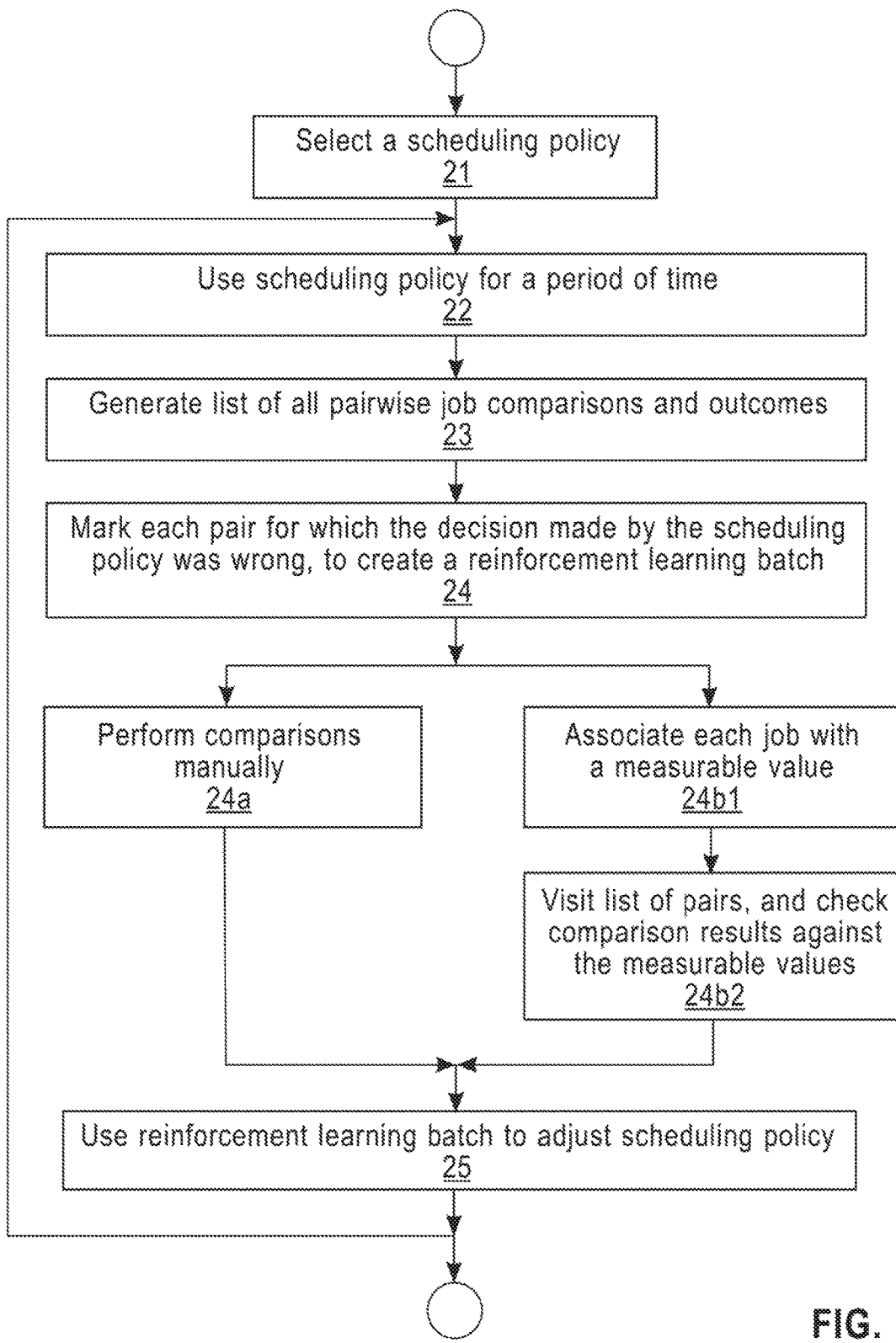
FIG. 2 is a flow chart of a self-adjusting scheduling algorithm according to embodiments of the disclosure.

FIG. 2 is a flow chart of a self-adjusting scheduling algorithm according to embodiments of the disclosure. Referring now to the figure, a method for self-adjusted scheduling begins at step 21 by determining a scheduling policy, such as a first-in-first-out (FIFO) scheduling policy or a last-in-first-out (LIFO). At step 22, the scheduling policy is used in a production environment for a certain period of time, such as one day, one week, or one month. For each job executed during this time period, an indicator value indicative of the business impact of each job is determined. At step 23, the scheduler compares the business impact indicator values for each pair of executed jobs, and generates a list of these comparisons together with the outcome of these comparisons, e.g., which is greater than, equal to, or less than the other. In addition, the scheduler compares the priorities for each pair of executed jobs, and generates a list of these comparisons together with the outcome of these comparisons. Each pair for which a decision made by the scheduling policy, based on the relative priorities of the pair of executed jobs, is inconsistent with the comparison outcome according to certain criteria is marked by the verification module at step 24, creating a reinforcement learning batch with negative rewards. The other pairs, which were correct, are submitted as well, but with positive rewards. In some embodiments, at step 24a, the comparisons are human-guided, in which service provider systems administrators verify each comparison made by the scheduling policy, or a subset of the list, and manually mark those which were wrong. In other embodiments, the comparisons are performed automatically. In these embodiments, each job is associated at step 24b1 with a certain value a posteriori, indicating its business impact, which can be measured, e.g., according to the amount of revenue the associated process generated, the public relations impact, the ecological impact, etc. The list of pairs is visited at step 24b2, and results of the comparisons are checked against the associated business impacts. For example, if jobs j1 and j2 were compared, where j had a higher priority, and j2 head a larger business impact, then pair (j1, j2) with outcome j1 is included in the reinforcement learning batch as an example of a wrong decision. Otherwise, it is included as an example of a correct decision. At step 25, a reinforcement learning algorithm according to an embodiment uses a reinforcement learning batch previously obtained to adjust the decision criteria used by the scheduler to determine the scheduling policy. The adjusted policy can be used again at step 22.

According to embodiments of the disclosure, reinforcement learning methods rely on tabular methods. One such method is Q-Learning, which can find an optimal action-selection policy for any finite Markov decision process by learning an action-value function that gives the expected utility of taking a given action in a given state and following the optimal policy thereafter. A policy is a rule that the agent follows in selecting actions, given the state it is in. The Q-learning equation is $$Q(s_t, a_t) \leftarrow \underbrace{Q(s_t, a_t)}_{\text{old value}} + \underbrace{\alpha_t}_{\text{learning rate}} \cdot \left( \overbrace{\underbrace{r_{t+1}}_{\text{reward}} + \underbrace{\gamma}_{\text{discount factor}} \cdot \underbrace{\max_{a} Q(s_{t+1}, \alpha)}_{\text{estimate of optimal future value}} - \underbrace{Q(s_t, a_t)}_{\text{old value}}}^{\text{learned value}} \right)$$

where is the reward observed after performing action in state, and where $\alpha$ is the learning rate, where $0 < \alpha \leq 1$, $\gamma$ is a discount factor that trades off the importance of sooner versus later rewards and can be interpreted as the likelihood to succeed at every time step, and Q is initialized to a predetermined value.

The value of scheduling a pair of jobs relative to each other, contained in variable $s_t$ above, is the previous value plus the newly learned reward weighted by a "learning rate" parameter. The learning rate determines whether more weight should be given to previously learned values or to the newly-received reward. For example, when α is 0.5, the mean of the reward and the previously learned value are used. After building a batch with both positive rewards, for correctly-ordered pairs of jobs, and negative rewards, for wrong decisions, the batch is submitted to a learning algorithm, which will update its Q-values. The Q-values here are the algorithm's estimate of the reward of scheduling one of the jobs first, so that the parameter a, is going to be either one of the jobs. As time passes, the algorithm learns with its mistakes and determines how to order the jobs. As for the states that go into $s_t$, embodiments can use a simple majority rule, in which cluster A is prioritized over cluster B if most of A's jobs have a higher business impact than those belonging to B.

Figure 3A:
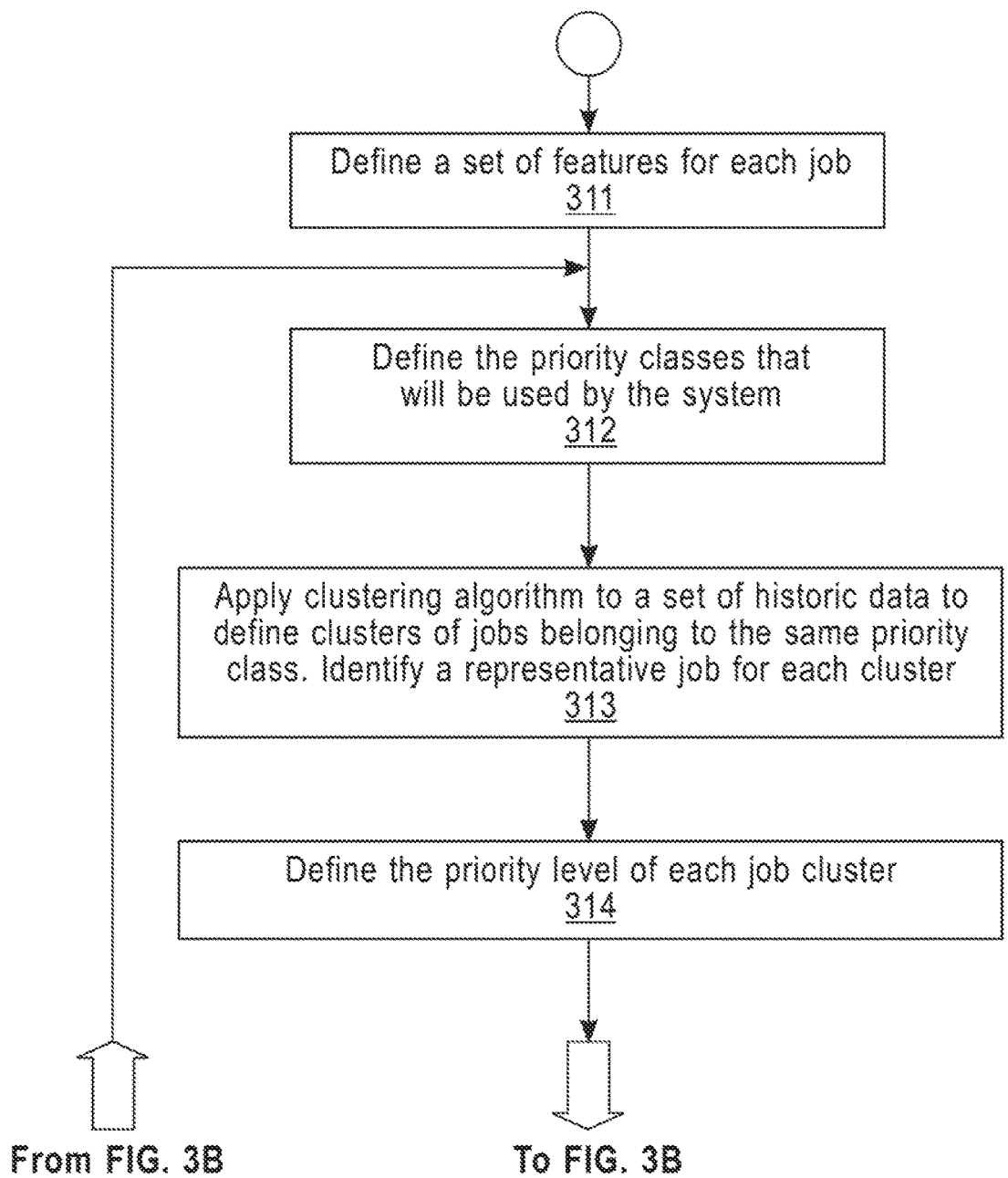
FIGS. 3A and 3B are flowcharts of a workflow according to an embodiment of a large airplane manufacturing company.
Figure 3B:
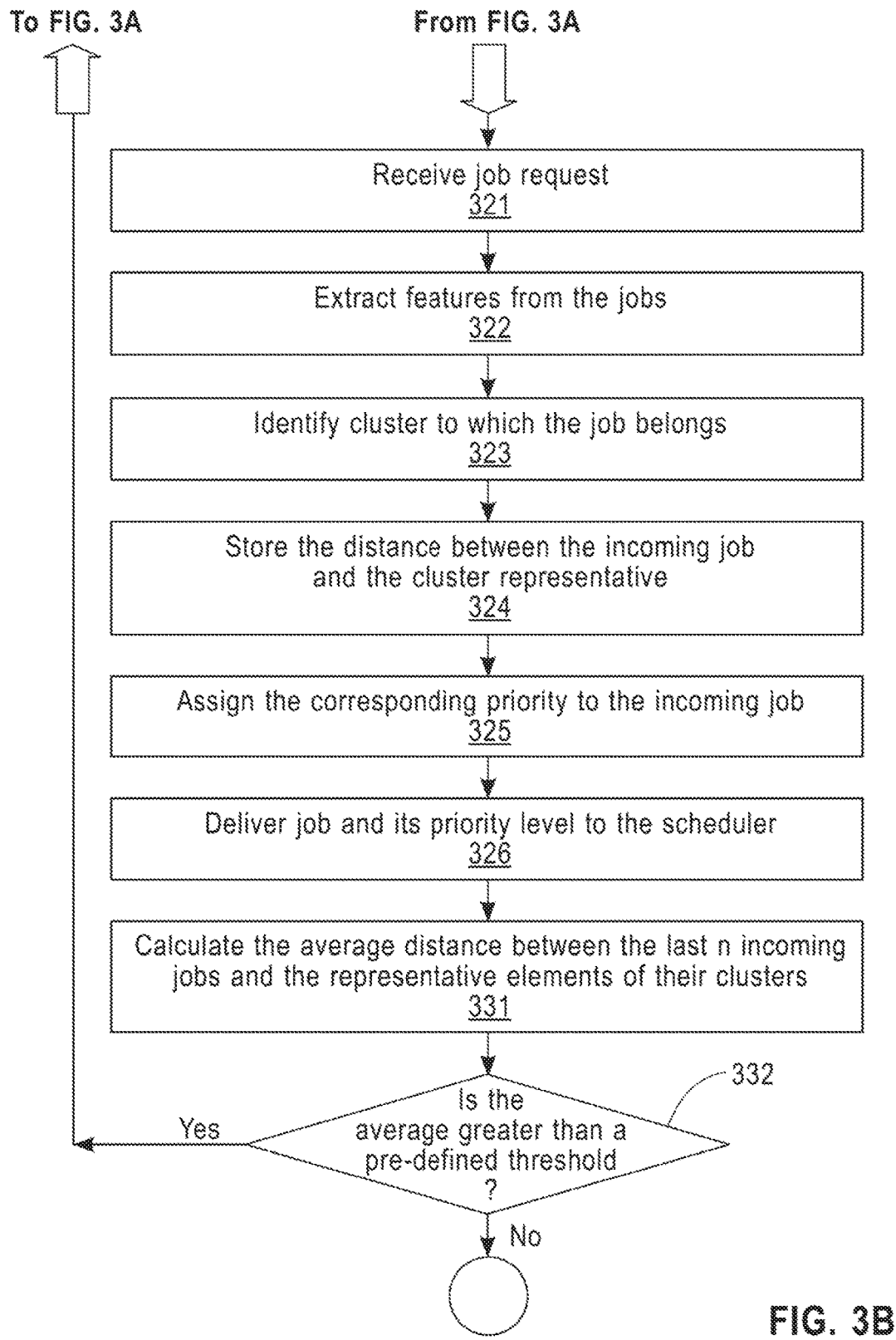

According to embodiments of the disclosure, consider a large company that performs several R&D activities in several different divisions. For example, a large airplane manufacturing company may have several divisions: one each for wings, engines, structural simulation, and accounting. This company has a shared multi-processor supercomputer, and the system administrator needs to determine the priority of jobs, which might change over time. FIGS. 3A and 3B are flowcharts of a workflow according to an embodiment of a large airplane manufacturing company.

Referring to FIG. 3A, a training phase according to an embodiment begins at step 311 by defining set of features for each job submitted to the supercomputer. Examples of features include, but are not limited to: project, division(s), submission time, expected execution time, resource consumption, user ID, etc.

At step 312, the system administrator defines the number of priority classes that will be used by the system. For example, two jobs belonging to a same priority class are ordered according to their submission time, whereas a job with higher priority is always serviced first.

At step 313, a clustering algorithm according to an embodiment, which is an unsupervised learning algorithm, is applied to a set of historic job data to define clusters/groups of jobs belonging to the same priority class. In addition, a clustering algorithm according to an embodiment can also identify a representative job for each cluster, based on, e.g., the centroid of the cluster.

At step 314, to define the priority level of each clusters, there are at least two possible scenarios: (a) the system administrator provides a business impact evaluation function/table that assigns a business value to the priority class, and based on these values, a system according to an embodiment automatically assigns priorities to clusters, where more valuable clusters receive a higher priority; or (b) the system administrator receives pairs of representatives of each class and indicates manually which should be serviced first. It is at step 314 that a method for self-adjusted scheduling such as that illustrated by FIG. 2 would be executed to compute the priority levels of each job.

Referring now to FIG. 3B, in a scheduling phase according to an embodiment, job requests submitted by users from all divisions are received at step 321. Features are extracted from the jobs at step 322. At step 323, the cluster to which the job belongs is identified, by, e.g., computing an Euclidean distance between each job and the representative of each cluster and selecting the cluster with smallest value. At step 324, the distance between an incoming job and the representative of its cluster is stored, and a corresponding priority is assigned to the incoming job at step 325. At step 326, the job, together with its priority level, are submitted to the scheduler.

A readjustment phase according to an embodiment verifies, at step 331, whether the average distance between the last n incoming jobs and the representative elements of their clusters exceeds a pre-defined threshold. If so, at step 332, a workflow returns to step 312 of a training phase according to an embodiment.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
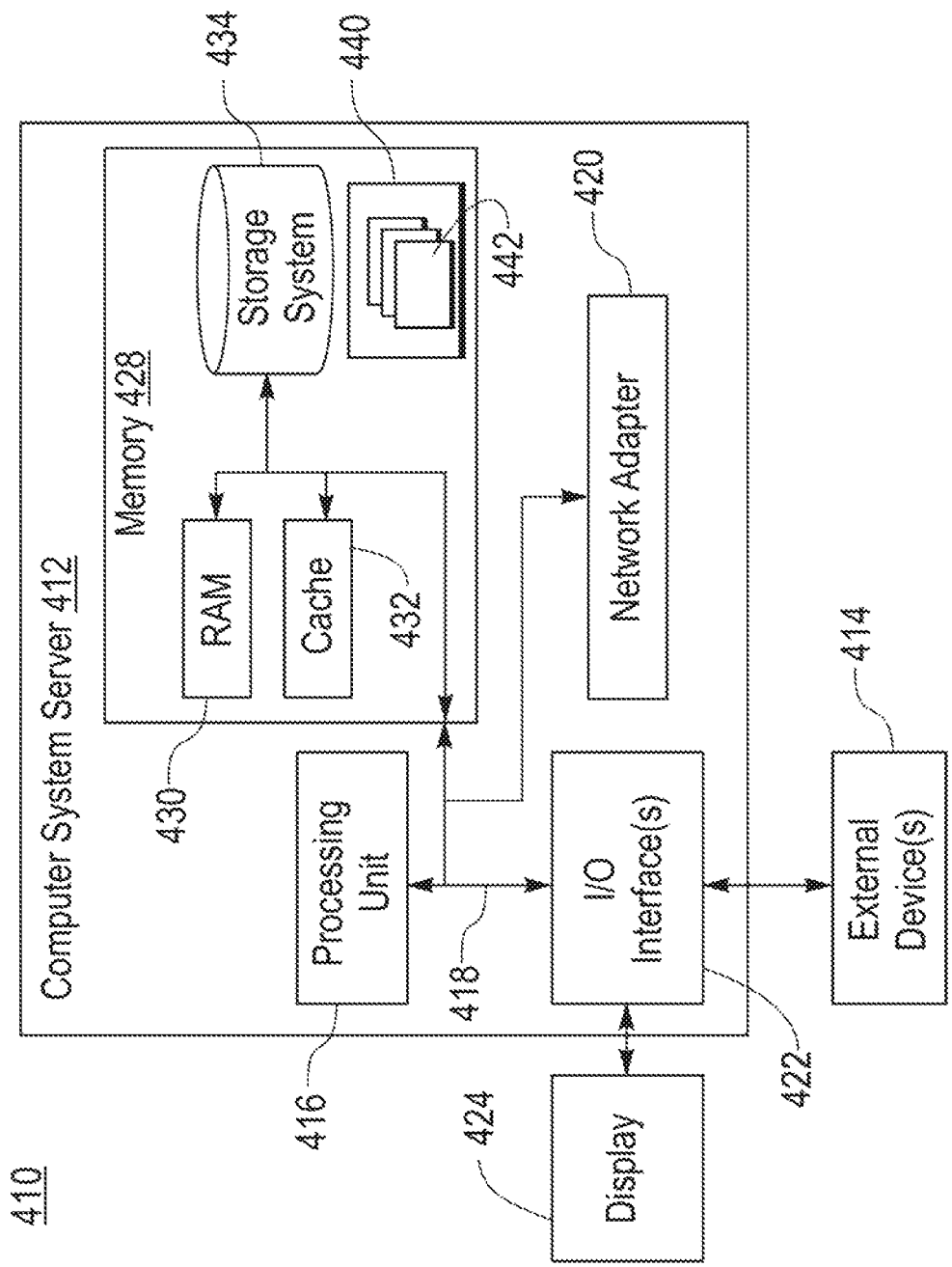
FIG. 4 is a schematic of an exemplary cloud computing node that implements an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth herein above.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
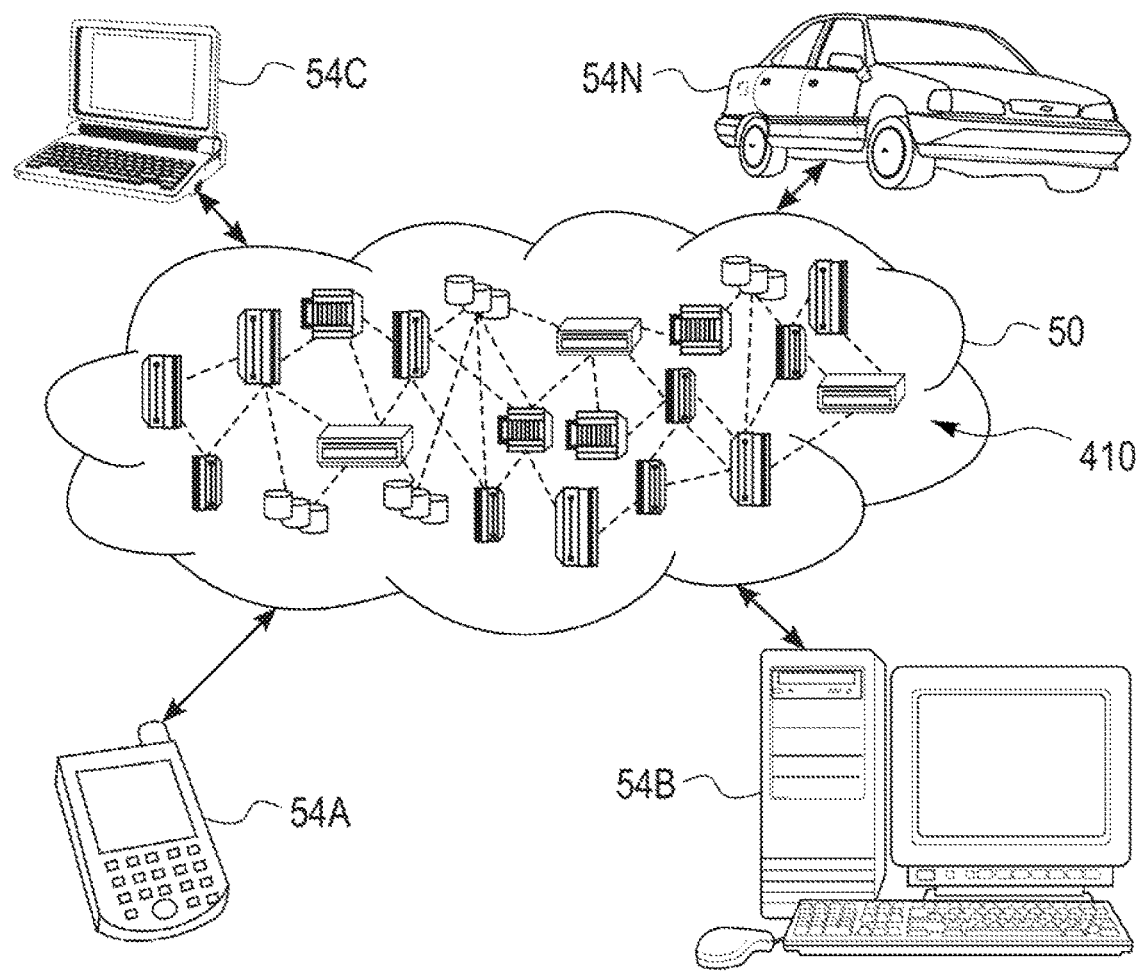
FIG. 5 shows an exemplary cloud computing environment according to embodiments of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for automatically generating a scheduling algorithm for a computer system, comprising the steps of:
defining a set of features for each job of a plurality of jobs;
defining a set of priority classes into which the plurality of jobs are classified;
clustering a set of historic job data to define clusters of jobs belonging to a same priority class, and identifying a representative job for each cluster, wherein the representative job for each cluster is based on a centroid of each cluster;
defining a priority level for each cluster;
executing incoming jobs on said computer system based on job requests received from users;
identifying a cluster to which each incoming job belongs by computing an Euclidean distance between each incoming job and the representative job of each cluster and selecting the cluster associated with a shortest distance;
calculating an average of the shortest distances between each of the most recent number of incoming jobs and the representative job of each incoming job's respective cluster;
determining whether said average distance exceeds surpasses a pre-defined threshold, and
defining a new set of priority classes into which the plurality of jobs are classified, when said average distance exceeds surpasses said pre-defined threshold.

2. The method of claim 1, wherein priorities are assigned to clusters based on a business value of the jobs in the cluster, wherein jobs in more valuable clusters receive a higher priority.

3. The method of claim 1, further comprising storing the distance between each incoming job and the representative of its cluster.

4. The method of claim 1, wherein executing jobs on said computer system comprises:
receiving job requests;
extracting features from each received job;
assigning a priority to the received job based on the cluster to which said job belongs; submitting the job and its priority level to a scheduler; and
executing said job.

5. A non-transitory program storage device readable by a computer, tangibly embodying a program of instructions executed by the computer to perform the method steps for automatically generating a scheduling algorithm for a computer system, comprising the steps of:
defining a set of features for each job of a plurality of jobs;
defining a set of priority classes into which the plurality of jobs are classified;
clustering a set of historic job data to define clusters of jobs belonging to a same priority class, and identifying a representative job for each cluster, wherein the representative job for each cluster is based on a centroid of each cluster;
defining a priority level for each cluster;
executing incoming jobs on said computer system based on job requests received from users;
identifying a cluster to which each incoming job belongs by computing an Euclidean distance between each incoming job and the representative job of each cluster and selecting the cluster associated with a shortest distance;
calculating an average of the shortest distances between each of the most recent number of incoming jobs and the representative job of each incoming job's respective cluster;
determining whether said average distance exceeds surpasses a pre-defined threshold, and
defining a new set of priority classes into which the plurality of jobs are classified, when said average distance exceeds surpasses said pre-defined threshold.

6. The computer readable program storage device of claim 5, wherein priorities are assigned to clusters based on a business value of the jobs in the cluster, wherein jobs in more valuable clusters receive a higher priority.

7. The computer readable program storage device of claim 5, wherein the method further comprises storing the distance between an each incoming job and the representative of its cluster.

8. The computer readable program storage device of claim 5, wherein executing jobs on said computer system comprises:
receiving job requests;
extracting features from each received job;
assigning a priority to the received job based on the cluster to which said job belongs; submitting the job and its priority level to a scheduler; and
executing said job.

* * * * *